United States Patent [19]
Foss

[15] 3,679,776
[45] July 25, 1972

[54] POLYMERIZATION OF HYDROCARBON DIENES WITH LITHIUM-SODIUM ALLOYS

[72] Inventor: Robert Paul Foss, Runnymede, Hockessin, Del.

[73] Assignee: E. I. du Pont de Nemours and Company, Wilmington, Del.

[22] Filed: April 1, 1970

[21] Appl. No.: 24,540

[52] U.S. Cl..........................................260/879, 260/94.2 M
[51] Int. Cl......................C08d 1/20, C08d 3/06, C08d 3/10
[58] Field of Search..................................260/94.2 M, 879

[56] References Cited

UNITED STATES PATENTS

| 3,091,606 | 5/1963 | Hsieh | 260/94.2 |
| 3,278,508 | 10/1966 | Kahle et al. | 260/94.3 |
| 3,451,988 | 6/1969 | Langer et al. | 260/94.6 |
| 3,492,369 | 1/1970 | Naylor | 260/879 |
| 3,526,604 | 9/1970 | Wadsworth | 260/2 |
| 3,557,255 | 1/1971 | Sharkey | 260/879 |

Primary Examiner—Joseph L. Schofer
Assistant Examiner—Richard A. Gaither
Attorney—James H. Ryan

[57] ABSTRACT

Conjugated hydrocarbon dienes are polymerized with lithium-sodium alloy initiator containing 0.1 to 90 mole percent sodium in a nonpolar medium at about −10°C. to 100°C. to yield the corresponding lithiopolydiene in which a desired high percentage of the repeating units have cis-1,4-structure. The lithiopolydienes can be used to prepare block copolymers of the ABA type in which the A units are polypivalolactone or a polymer of any other anionically polymerizable monomer and the B unit is a polydiene. The alloys can also be applied to prepare homopolydienes with high 1,4-cis structure, which are useful as vulcanizable elastomers.

12 Claims, 1 Drawing Figure

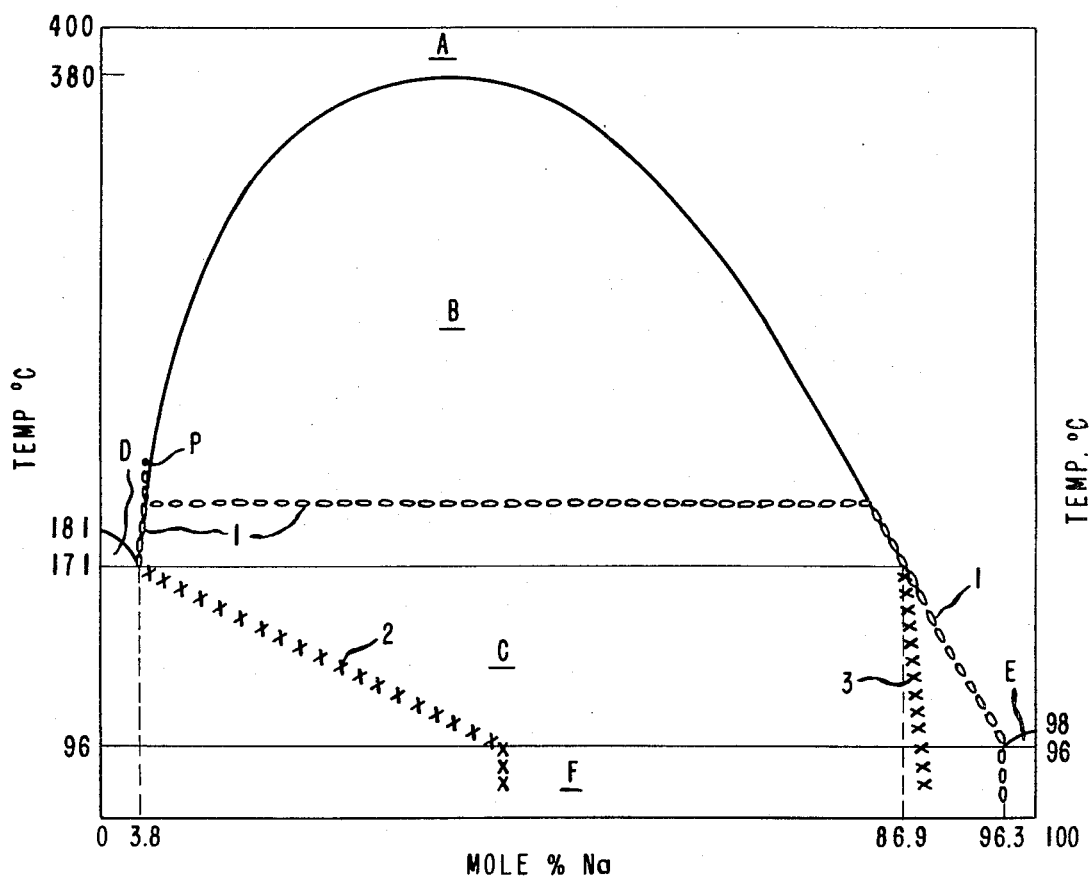

POLYMERIZATION OF HYDROCARBON DIENES WITH LITHIUM-SODIUM ALLOYS

BACKGROUND OF THE INVENTION

1. Field of the Invention

This invention relates to the polymerization of conjugated hydrocarbon dienes. More particularly, it relates to the polymerization of butadiene and isoprene.

2. Description of the Prior Art

In the field of polydiene elastomers, polymers with high cis-1,4-structure are of paramount importance. Lithium metal applied as an initiator in nonpolar media, is unique in giving polydienes having at least 90 percent cis-1,4-structure. Other alkali metals give polydienes having mainly 1,4trans, 1,2- and 3,4-structure. However, the use of lithium metal in nonpolar media has a serious drawback in that it gives variable and long induction periods and unreproducible performances. The use of polar solvents in order to achieve reliable performance with lithium metal is not acceptable because polar solvents alter the polymerization mechanism, giving mostly the 3,4- or 1,2- polymer. The use of lithium alkyls instead of lithium metal results in a more reliable process; however, the level of cis-1,4-polymer structure obtained is only 65–75 percent.

SUMMARY OF THE INVENTION

According to the present invention there is provided a process for the polymerization of conjugated hydrocarbon dienes comprising contacting dienes of the formula

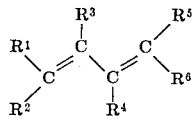

wherein the R's are H, methyl or ethyl, under anhydrous and oxygen-free conditions in nonpolar medium at about −10°C. − 100°C. with a lithium-sodium alloy of about 0.1–90 mole percent sodium content to obtain the corresponding lithiopolydiene in which at least 50 percent of the repeating units have cis-1,4-structure.

Further according to the present invention, there are provided lithiopolydiene systems prepared according to the above process possessing increased reactivity and being useful in the preparation of ABA block copolymers in which the A units are polypivalolactone or a polymer of any other anionically polymerizable monomer and the B unit is a polydiene. The lithium-free polydienes obtained by hydrolytic post-treatment are also independently useful as vulcanizable elastomers.

For the purposes of this description the definition of the term alloy is that given on page 95 of Mellor's Comprehensive Treatise on Inorganic and Theoretical Chemistry, Vol II, Supplement II, Pt. I, John Wiley and Sons, 1961, which is as follows: Alloy — a mixture with metallic properties, composed of two or more elements of which one at least is a metal.

DESCRIPTION OF THE PREFERRED EMBODIMENTS

Unexpectedly, it has been found that the use of lithium-sodium alloys in the polymerization of isoprene in nonpolar media yields reliable, reproducible reactions with little or no induction period. The resulting polymer may contain as much as 97 percent cis-1,4-structure. In addition, the use of the alloy also results in more rapid polymerization rates in both neat and diluted systems.

The sodium content of the lithium-sodium alloy of the present invention can vary widely between about 0.1 mole percent and about 90 mole percent.

The alloys are prepared by mixing lithium and sodium in mineral oil at 200°C. or decalin at 192°C. with a high-speed stirrer. Preferably the metals are melted and mixed together prior to dispersing in mineral oil or decalin. The mixture is then rapidly cooled with rapid agitation to form a fine dispersion.

The alloy mixture can be used directly. It may be beneficial, however, to remove the dispersant before initiating diene polymerization. This is because it is easier to remove it at this time than to try to extract it from the final polymer. In addition, removal reduces dilution by the inert dispersant and also removes any metal-organic impurities which may have been formed during preparation of the alloy.

The dispersant is usually removed by the following procedure:

1. The mixture of alloy in decalin or mineral oil is transferred to a centrifuge tube under argon and centrifuged. The alloy's density may vary between 0.53 (pure Li) and 0.97 (pure Na) depending on the sodium content, and, therefore, will either sink or float in the dispersant. Occasionally, hydrocarbon solvent mixtures must be added to adjust the density of the dispersing medium to allow effective centrifugal separation.

2. The dispersant is removed under argon and an inert wash solution is added. This solution can consist of hydrocarbons such as pentane or hexane, or ethers such as THF or diethyl ether. The mixture is agitated, recentrifuged, and the wash medium removed. This step may be repeated successively. The final wash is always with hydrocarbon solvent to insure removal of all traces of ether which could interfere with the desired 1,4-cis polymerization of diene monomer.

2. Finally, pentane is added to the alloy and the mixture transferred to the reactor under a stream of argon. The reactor is warmed while flushing with argon thus evaporating the pentane and leaving a finely divided alloy powder.

Conjugated hydrocarbon dienes of the formula

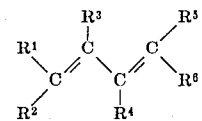

wherein the R's are H, methyl or ethyl, can be polymerized by the use of lithium-sodium alloys as initiators. Hydrocarbon 1,3-dienes, wherein $R^1$, $R^2$, $R^5$ and $R^6$ are H, are preferred especially the ones wherein $R^3$ and $R^4$ are H or methyl. Butadiene and isoprene are the most preferred dienes because they are commercially available at low cost, are easy to obtain, and form good rubbers.

Representative of the monomers which can be polymerized by the process of the present invention are butadiene, isoprene, 2,3-dimethylbutadiene, 2-methyl-3-ethylbutadiene, 2,3diethylbutadiene, 2,4-hexadiene, 3-methyl-2,4-hexadiene, 3,4-dimethyl-2,4-hexadiene, 3,4-diethyl-2,4hexadiene, etc.

The alloys are more reactive for initiating diene polymerization than either of the pure metals alone thus demonstrating a synergistic effect. Suprisingly, they also have the most important advantage of pure lithium in that the polydienes produced have very high proportions of cis-1,4 configurations.

The reason for the increases reactivity of the Li-Na alloys is believed to be as follows: Sodium, which has a lower ionization potential than lithium, serves as a low-energy electron source. Since $Li^\oplus$ is much more strongly complexed or solvated than $Na^\oplus$ the higher energy of solvation of $Li^\oplus$ results in formation of $Li^\oplus$ complex centers on the catalyst surface. The calculated equilibrium constant for the reaction

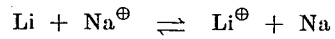

is $10^4$–$10^6$ as calculated from standard electrode potentials, i.e. Li quantitatively replaces

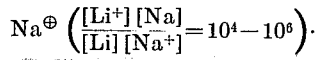

Sodium serves, therefore, as a low-energy carrier for formation of these active sites.

The 1,4-cis content of the polymers initiated by alloy is essentially identical to that initiated by pure lithium over a large sodium content range from 0.1 percent Na to greater than 87 percent. When the sodium content is increased beyond 90 percent the 1,4-cis composition of the polymer drops significantly and its structure approaches that of pure sodium initiated polymer.

Polymer obtained from physical mixtures of pure lithium and pure sodium having compositions within the effective alloy range give polymer with 3,4- structure characteristic of that initiated by pure sodium, or when the Li composition is overwhelming, polymer characteristic of that initiated by pure lithium. Both the reaction rates and the ultimate reactivity of the lithio polydiene systems are characteristic of systems initiated by the pure metals. These results further indicate that the metals must be alloyed to create the conditions necessary to cause the polymerization to proceed in the proper manner to give polymer with 1,4-cis structure.

The diene polymerization occurs on the outer surface of the alloy particles. Therefore, it is the outer crust composition which is most important in effecting its control. The sodium content of this outer crust will always be greater than or equal to that of the mixture as a whole. The reason for this may be understood by considering the Li-Na phase diagram shown in the Figure (page 98, Mellor's Comprehensive Treatise on Inorganic and Theoretical Chemistry — Vol II, Supplement II, Pt. I., John Wiley and Sons Inc., 1961).

The phase diagram is separated into six regions of principle interest:

A. A homogeneous melt region where Li and Na are totally miscible.

B. A region where the metals exist as two separate immiscible liquid phases, one rich in Li and the other rich in Na. In refluxing decalin at 192°C. the compositions of these phases are about 95 percent Li–5percent Na and 17 percent Li–83 percent Na. An attempt to make an alloy with Na composition anywhere between 5 percent and 83 percent will result in formation of two molten liquid phases with these compositions.

C. A region where crystalline Li exists in equilibrium with a sodium-rich melt.

D. A region where crystalline lithium exists in equilibrium with a lithium-rich melt.

E. A region where crystalline Na exists in equilibrium with a sodium-rich melt.

F. A region where crystalline lithium and sodium exist in distinct intimate microcrystalline domains.

If sodium and lithium are melted together in such proportions that the mixture's composition lies in region A they will form a homogeneous melt. This is exemplified by a hypothetical mixture prepared in refluxing decalin represented by point P in the phase diagram. If equilibrium conditions are maintained while the sample is cooled the melt will separate into two liquid phases when the mixture passes into region B as shown by curve 1. Two liquid phases will not form if the sodium content is less than 3.8 percent or greater than 86.9 percent. At 171°C. crystalline lithium will from in equalibrium with a sodium rich melt having a composition of 86.9 percent Na. If the Na content is less than 3.8 percent lithium will begin to crystallize at a somewhat higher temperature between 171° and 181°C. Further cooling under equilibrium conditions, represented by curve 1, results in formation of an increasingly Na-rich liquid phase on the crystallizing metal surface. At 96°C. the Na and remaining Li crystallize forming an outer crust on the metal with a 96.3 percent Na composition.

Cooling under non-equilibrium conditions probably results in formation of metal particles with outer crust compositions which contain less sodium than the 96.3 percent eutectic composition. This is represented in the phase diagram by curves 2 and 3.

It is this latter type of alloy prepared under non-equilibrium conditions which is preferred for this invention. The Na-rich outer crust (96.3 percent) formed by equilibrium cooling is not satisfactory for forming 1,4-cis polymer even though it is extremely reactive. A specifically prepared alloy containing 96.3 percent Na gave polymer that was very low in 1,4-cis content (≈40 percent). However, the Na-rich alloy formed by rapid cooling of the 86.9 percent mixture as shown by curve 3 is not only extremely reactive but also gives high 1,4-cis polymer. The 96.3 percent alloy probably does not contain enough Li to complex quantitatively with all of the anions formed on the metal surface, a condition needed to give high 1,4-cis polymer.

The high reactivity of the alloys is believed to result from action of a sodium-rich alloy coating on the metal particles whose sodium content is greater than that of the initial mixture and less than that of the sodium-rich eutectic composition of 96.3 percent, probably less than 90 percent Na.

It is advantageous to provide a large surface area for the initiator since that will result in a higher reactivity, better control over the molecular weight of the polydiene and more economical use of the metal. Since it appears that the metal consumed in the reaction comes only from the outer coating of the alloy particle, the total amount of metal needed depends on the size of the particles. The larger the particle, the smaller the surface area and the more catalyst that will be necessary to obtain a given molecular weight. The molecular weight of the polydiene is dependent on the amount of catalyst surface area exposed during the reaction and thus on the amount of metal consumed.

The initiation efficiency also seems to be related to the sodium content in the alloy. High sodium alloys (87 percent) appear to be about six times more efficient than than low sodium alloys (3.8 percent) and about ten times more efficient than pure lithium as to the amount of metal consumed.

The preferred range of catalyst is 0.01 weight percent to 0.2 weight percent of the monomer. However, as the reactivity of catalyst increases, a larger amount is consumed and therefore the amount needed decreases. About 0.0001 to 0.001 weight percent alloy may be sufficient to obtain desired molecular weights with formation of extremely small alloy particles. This amount is reasonable for lithium-rich alloys and may be attainable by exploding a wire of proper composition by a high voltage discharge in an inert atmosphere. Alloy consumption must not exceed the Li percentage however. This limits the sodium-rich alloy minimum to about 0.01 to 0.001 weight percent to obtain polydienes with reasonable molecular weights (≈100,000).

On the other hand large alloy particles can require more than 0.2 weight percent alloy for a reasonable molecular weight. Generally, no further advantage is obtained by the use of more than 1 weight percent initiator.

The polymerization reactions should be carried out under anhydrous and oxygen-free conditions. Water irreversibly terminates anionic polymerizations by the reaction

Oxygen reacts with radicals (the radical anions) to terminate the reaction by the process

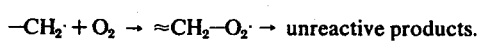

Water, oxygen and nitrogen also react with Li + alloy to form oxides, hydroxides and nitrides.

The cis-1,4 content of the product is dependent on both alloy composition and temperature. High sodium content alloy coupled with high temperature (≈80°C.) may give polymer with less than 90 percent 1,4-cis content and still be a good rubber. The same alloy at low temperature or a different alloy with less sodium at high temperature may give polymer with more than 90 percent 1,4-cis structure. A polymer with very high 1,4-cis content has the best rubber (elastomeric) properties. However, even polymer with as little as 50 percent is quite good and may find many useful applications.

In order to assure the preparation of predominantly cis-1,4 structure, the reaction should be carried out in a non-polar medium. Thus, the reaction can be carried out neat or in the presence of hydrocarbon solvent. Most preferred is to use the diene itself as a nonpolar medium. Aliphatic and aromatic hydrocarbon solvents with low enough boiling points to allow easy removal after the reaction is over, are preferred. Such solvents, are, for example, hexane, heptane and benzene.

Temperature has a profound influence on the reaction rate. It is most convenient to carry out the reaction at reflux temperatures. For isoprene this is 35°C. The pot temperature (and thus the reaction temperature) can be raised by adding solvent. Increased temperature increases the rate significantly. This becomes apparent as hexane is added to a polymerizing mixture. If the temperature becomes too high, however, the 1,4-cis content decreases and the amount of 3,4-polymer formed increases. Also crosslinking and chain-branching becomes significant at higher temperatures. At 0°C. the reaction essentially stops with Li but does proceed slowly with alloy. Alloy therefore can be used at lower temperatures than pure Li.

Generally, temperatures of from about 31 10°C. to about 100°C. are suitable. The preferred temperature range is about 25°C. to 80°C.

The reaction mixtures should be well agitated. This prevents aggregation of polymer globules and assures uniform concentration and temperature gradients. It also physically abrades the metal particles and allows uniform distribution of comonomers used in forming block copolymers.

The reaction of isoprene with Li-Na alloy gives lithio polydienes, which can be pictured as at least bifunctionally lithium terminated polydiene blocks. Polypivalolactone end blocks or a polymer of any other anionically polymerizable monomer may be attached to these to form ABA type block copolymers. A significant initial solvent effect is expected in these systems since in order to form a dianion, radical anions must be formed on adjacent or near adjacent sites on the catalyst surface. Any diluent may be expected to compete with monomer for adsorption at these locations. Therefore, to achieve the shortest induction periods neat monomer and dry initiator should be used. After the reaction has started hydrocarbon solvent can be added.

The functionality of the lithio polydienes may be increased to values greater than bifunctional by chain branching. This may occur in the present systems at higher temperatures (above about 80°-100°C.) and/or by the use of alloys with high Na content where lithio polydienes react with olefinic groups in neighboring polydiene chains. Branching becomes increasingly significant with increasing temperature and possibly with increasing catalyst activity. However, chain transfer also becomes increasingly important at these higher temperatures, decreasing the functionality of some chains while increasing that of others.

Alloy initiated lithiopolydiene systems differ from pure lithium initiated systems in their relative reactivity toward pivalolactone (PVL) in tetrahydrofuran (THF) to form ABA block copolymers. This is because lithiopolydiene is converted to solvated ion pairs more easily in the presence of alloy. The difference lies in the relative ease of converting complexed strongly covalent lithio polydiene which is initially coated on the metal surface in hydrocarbon media to solvated $Li^{\oplus \ominus}$ polydiene ion pairs in THF. Once formed the polydiene anions are equally reactive toward PVL in THF regardless of whether they were formed from alloy, lithium metal, or alkyl lithium systems.

The proposed reason for increased ease of formation of solvated ion pairs in alloy systems is again related to the lower energy of ionization of sodium over lithium. The exchange reaction between $Na^{\ominus}+Li$ gives solvated $Li^{\oplus}$ ions and polydiene anions in the THF medium.

Percentages in the examples that follow are mole percent, unless specifically stated otherwise.

EXAMPLE 1

Initiation of Isoprene Polymerization by Lithium-Sodium Alloy 0.3 g. of Li ribbon and 0.03 g. of Na ribbon were placed in a stainless steel reactor with 100 ml. of decalin. The mixture was brought to reflux to melt the metals and then stirred at high speed with a "stirovac" high-speed stirrer to form a fine dispersion. After stirring for 5 minutes at high speed the heater was removed and the reactor allowed to cool.

As the temperature passed through 125°C., isoprene dried first over $CaH_2$ and then over $Bu^{\ominus}Li^{\oplus}$ was added dropwise to the alloy mixture. The color of the solution turned purple upon the addition of isoprene. The color became darker as cooling continued. All monomer was added over a period of one hour. At this time the mixture was quite viscous. 80 minutes later 80 ml. of tetrahydrofuran was added. The purple color reappeared on dilution. The retention of purple color upon addition of tetrahydrofuran indicated all isoprene had reacted.

The product was isolated by precipitating in ethanol, redissolving in ether and reprecipitating in methanol. The tacky polymer was dried under vacuum.

Infrared analysis of the product showed it contained 80 percent 1,4-cis structure. This is remarkably high considering both the high temperature of the reaction and the fact that tetrahydrofuran was added before the lithio polydiene anions were destroyed. Both of these factors favor formation of 3,4 polymer in the presence of residual isoprene monomer.

EXAMPLE 2

Action of Isoprene With Lithium Powder

A 250-ml. round-bottomed glass flask equipped with a glass-coated stirring bar, an inlet for introduction of isoprene by distillation, and a reflux condenser with means for maintaining a protective flow of argon at the top was heated with a flame while being purged with argon. The flask was cooled to room temperature, 0.03 g, of high purity lithium powder (100 $\mu$ size, Foote Mineral Co.) was introduced under argon, and 100 ml. of isoprene was added by distillation. The mixture was then stirred magnetically and heated to reflux temperature. After 140 minutes the liquid was noticeably viscous; it was cooled 0°C. with continued stirring; and a sample was removed. Infrared analysis of the sample showed the presence of polyisoprene having about 95 percent cis-1,4 structure. To the mixture remaining in the flask at 0°C. was then added 0.5 g. of pivalolactone, followed immediately by 10 ml. of tetrahydrofuran, and the mixture was stirred for 1 hour at 0°C. No evident change occurred. The mixture was poured into an excess of a 2/1 alcohol-ligroin mixture, and the precipitated polymer was isolated. Infrared analysis of the polymer showed no essential change in the 95 percent content of cis-1,4-structure in the polyisoprene. Infrared also indicated incorporation of approximately 5 percent PVL into the polymer.

Results similar to those described above were obtained in runs with highly pure lithium in the form of a dispersion in mineral oil prepared by the method described in Example 3, Part A except for the absence of sodium metal.

EXAMPLE 3

Action of Isoprene With Lithium-Sodium Alloy

A. Preparation of Alloy Dispersion

Dry mineral oil (220 ml.), high purity lithium ribbon (5.0 g., 0.714 mole) and sodium metal (0.625 g., 0.027 mole) were placed under argon into a 1,000 ml. stainless steel beaker equipped with a clamped-on three-necked glass tip fitted with a double-trapped gas outlet, a "stirovac" high-speed stirrer and a stainless steel dial thermometer. Between the beaker and the gas outlet was inserted a T-tube for introduction of argon and maintenance of an argon atmosphere within the system. Taking care to avoid etching the glass portion of the reactor with molten alloy, the mixture was moderately stirred and heated. It was held at 225°C. for 10 minutes to blend the melted metals and then stirred at high speed for 15 minutes. It was then cooled slowly to 50°C. with continued stirring and was transferred under argon to a round-bottom glass storage flask. The storage flask was cooled to room temperature, evacuated and sealed.

A dispersion of Li-Na alloy in decahydronaphthalene (decalin) was similarly prepared at reflux temperature (ca. 190°C.). In this preparation the mixture was stirred slowly for 15 minutes and at high speed for 15 minutes, after which it was cooled rapidly to 80°C. while being stirred at high speed and finally was cooled to room temperature while being stirred at low speed.

B. Action of Isoprene With the Alloy

A 250-ml. reactor, as described in Example 2, was charged with 1 ml. of the alloy dispersion in mineral oil (equivalent to about 0.025 g. of Li-Na alloy) under argon, 100 ml. of isoprene was added by distillation, and the mixture was heated to reflux with stirring. The mixture was noticeably viscous after 20 minutes, was very sightly grey in appearance, and contained a few floating particles of shining metal. Following the procedure of Example 2, the mixture was cooled to 0°C., a sample was removed for infrared analysis, and 0.5 g. of pivalolactone followed immediately by 10 ml. of tetrahydrofuran was added to the remainder. The sample removed for analysis, like that of Example 2, showed the presence of polyisoprene having about 95 percent cis-1,4-structure. However, the residual mixture immediately turned yellow on introduction of the pivalolactone and tetrahydrofuran. The yellow mixture was stirred for 1 hour at 0°C., then was poured into ligroin-alcohol, and the precipitated polymer isolated and analyzed as in Example 2. The polymer no longer showed the presence of cis-1,4-polyisoprene at the 95 percent level, but showed a significantly enhanced proportion of polyisoprene of 3,4-structure. Infrared analysis also indicated that approximately 20 percent pivalolactone had been incorporated.

This result suggests that the alloy-promoted polymerization system is significantly more reactive per se with pivalolactone, and that the introduction of the lactone and/or tetrahydrofuran, caused subsequent polymerization of residual monomeric isoprene by the 3,4- mechanism.

In similar experiments involving the use of hexane or benzene as solvents, the formation of polyisoprene occurred in essentially the same fashion. Infrared analyses of the polymers showed them to have cis-1,4-structure to the extent of 90 percent or more.

Likewise, when Li-Na alloys containing 2.0, 2.9, 3.3 and 5.0 mole percent of Na were used, the results were essentially the same.

C. Reactivity of the Polymer in Absence of Isoprene

In another experiment following the procedure of Part B, above, a closeable take-off head was added to the reactor. When the viscous stage was reached, dry hexane was added to the polymerization mixture before it was cooled to 0°C. Monomeric isoprene was then removed under vacuum through the take-off head. Subsequent addition of pivalolactone followed by tetrahydrofuran resulted in formation of a slightly purple color and the appearance of a gelatinous precipitate within 2 minutes; and after 45 minutes the reactor was filled with an opaque, white solid polymer. A sample was removed at 18 minutes after the addition of pivalolactone and tetrahydrofuran, and infrared analysis of this sample showed the presence of polypivalolactone to the extent of about 30 percent. After 1 hour PVL had been incorporated to the extent of about 55 percent. The analysis also showed that the polyisoprene in the product corresponded to the polyisoprene present prior to the addition of pivalolactone, i.e., it was about 95 percent cis-1,4-polyisoprene.

This result indicates that the alloy-promoted polyisoprene is highly reactive at 0°C. with pivalolactone in tetrahydrofuran. The polyisoprene segment retains its very high 1,4-cis content provided monomeric isoprene is removed before adding PVL and THF. The reactivity with pivalolactone under these conditions distinguishes the Li-Na alloy-promoted polyisoprene from the Li powder-promoted polyisoprene of Example 2, since the latter polymer is essentially unreactive with pivalolactone below about 25°C. (cf. coassigned U.S. Pat. No. 3,557,255 ).

EXAMPLE 4

Li Metal and Li-Na Alloy Promoted Polyisoprene with Dianionic End Groups

Twin experiments were carried out with apparatus and procedure as described in Example 2. Isoprene (50 ml.) was polymerized by means of 0.01 g. of high purity lithium powder (flask A) and 0.01 g. of Li-Na alloy, prepared as in Example 3-A (Flask B). When appreciable viscosity had developed the heat was removed and 50μl. of tritiated water was added to each reaction mixture. The mixtures were allowed to react for 40 minutes, including a final 10 minutes under reflux, after which they were colorless. The flasks were then cooled and 200 ml. of ethanol was added to each, followed by 2 ml. of acetic acid dissolved in ethanol. The precipitated polymers were isolated, dissolved in toluene, and reprecipitated with 100 ml. portions of ethanol. All of these operations were conducted under argon. The polymer samples were finally dried under vacuum overnight and then placed in sealed tubes under high vacuum for storage.

Samples of the polymers were analyzed for molecular weight and tritium count. Sample A showed an equivalence of 1.76 and Sample B and equivalence of 1.94, corresponding to ends per chain. These results show, within experimental error, that the polydienyl segments formed by reacting isoprene with lithium, either as pure lithium metal or as Li-Na alloy, are bifunctional.

EXAMPLE 5

Action of Isoprene With Lithium-Potassium

A lithium-potassium dispersion in mineral oil was prepared by the method of Example 3, Part A, from 5 g. (0.714 mole) of highly pure lithium ribbon and 0.56 g. (0.0143 mole) of potassium metal. A mixture of 10 ml. of this dispersion and 100 ml. of isoprene was stirred at reflux under argon. The mixture was noticeably viscous after 40 minutes, and thereafter 300 ml. of benzene was added incrementally over an additional period of about 55 minutes. A sample was removed at this point, and infrared analysis showed the presence of polyisoprene having predominantly 3,4- structure. A repeat of this experiment using hexane in place of benzene gave identical results.

These results indicate that Li-K does not promote polymerization of isoprene by the cis-1,4 mechanism even in non polar media.

EXAMPLE 6

A. Preparation of 86.9 percent Na Alloy

The following were placed in a 500 ml. stainless steel flask fitted with a reflux condenser, thermometer, and high speed stirrer (the apparatus contained no glass which could come into contact with the molten metal):

1. 100 ml. decalin
2. 2 g. sodium (0.087 moles)
3. 0.092 g. Li (0.013 moles)

The mixture was brought to reflux at 192°C. for 10 minutes while stirring at low speed as the metals melted. It was then stirred for 10 minutes at medium speed to mix the metals and then at high speed for 10 minutes to disperse the alloy. Heat was removed and the mixture rapidly cooled by immersing in an oil bath. High speed stirring was maintained until the temperature fell below 70°C. The alloy was then transferred to a storage flask and kept under argon until ready for use.

B. Preparation of 96.3 percent Na in Li Alloy

The procedure followed is the same as for the 86.9 percent alloy. The following materials were used:
1. 100 ml decalin
2. 2 g sodium (0.087 moles)
3. 0.0234 g Li (0.00334 moles)

C. Preparation of Pure Na Dispersion
Procedure is the same as for A. Used:
1. 100 ml. decalin
2. 2 g. sodium D. Polymerization of isoprene with (1) 100 percent Li dispersion, (2) 3.0 percent Na in Li alloy, (3) 86.9 percent Na in Li alloy, (4) 96.3 percent Na in Li alloy, (5) 100 percent Na dispersion. The same apparatus and procedure were used as described in Examples 2 and 3. The metals were washed and dried as described earlier in the alloy purification procedure. The isoprene was polymerized by refluxing at 35°C. When viscous, 50 ml. of hexane was added excess isoprene was stripped from the reaction mixture. Pivalolactone (PVL) and THF were then added at 0°C. The results are summarized in the following table.

TABLE

| Initiator | (1) 100% Li | (2) 3.8% Na/Li | (3) 86.9% Na/Li | (4) 96.3% Na/Li | (5) 100% Na |
|---|---|---|---|---|---|
| Amt. of isoprene, ml | 50 | 50 | 50 | 50 | 50 |
| Metal added, g | 0.2 | 0.2 | 0.2 | 0.2 | 0.2 |
| Viscous time,* min | 80 | 20 | 15 | 10 | 90 |
| Amt. of PVL, ml | 1 | 1 | 1 | 1 | 1 |
| Amount of THF, ml | 20 | 20 | 20 | 20 | 20 |
| PVL incorporated after ½ hr. at 0° C., percent | ~4 | ~15 | ~35 | ~15 | ~8 |
| 1,4-cis content, percent | 95 | 95 | 94 | 45 | 30 |

* The times reported for the reaction to become viscous are only approximate due to uncertainties at both the start and finish of the reaction and therefore may vary as much as ±5 min. or more. Some of the variation in rate may be due to variation in particle size of the alloy. Each alloy composition may be subject to different stresses and strains, fractures etc. during manufacture thus giving different particle sizes under identical preparation conditions.

The reactive lithiopolydiene systems of the present invention are useful in the preparation of ABA type block copolymers of improved properties wherein the A units are polypivalolactone or a polymer of any other anionically polymerizable monomer and the B unit is butadiene or isoprene. These copolymers are lively thermoplastic elastomers, retaining their good properties over a wider temperature range than present thermoplastic elastomers. For example they remain strong in boiling water whereas the styrene-isoprene copolymers of the prior art are quite weak above 60°C.

Polyisoprene and polybutadiene prepared by the process of the present invention result in good synthetic rubber susceptible to sulfur curing and fabrication by commercial methods in general.

The embodiments of the invention in which an exclusive property or privilege is claimed are defined as follows

I claim:

1. A process for polymerizing a conjugated hydrocarbon diene comprising contacting a diene of the formula

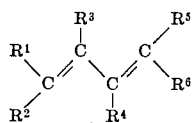

the R's are hydrogen, methyl or ethyl,
under anhydrous and oxygen-free conditions in a nonpolar medium at about 10°C to 100°C with
a lithium-sodium alloy of about 0.1 to 90 mole percent sodium content
to obtain the corresponding lithio polydiene in which at least about 50 percent of the repeating units have 1,4-cis structure.

2. The process of claim 1 wherein said nonpolar medium is the diene itself.

3. The process of claim 1 wherein said nonpolar medium is hexane, heptane or benzene.

4. The process of claim 1 wherein the polymerization is carried out at about 25°C to 80°C.

5. The process of claim 1 wherein $R^1$, $R^2$, $R^3$ and $R^4$ are hydrogen.

6. The process of claim 2 wherein $R^3$ and $R^4$ are hydrogen or methyl.

7. The process of claim 3 wherein the diene is isoprene.

8. The process of claim 3 wherein the diene is butadiene.

9. A process of preparing an ABA type block copolymer wherein A is a polypivalolactone segment of the copolymer and B is a polydiene in which at least about 50 percent of the repeating units have cis-1,4-structure; said process comprising
a. contacting a diene of the formula

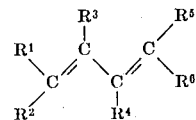

the R's are hydrogen, methyl or ethyl,
under anhydrous and oxygen-free conditions in a nonpolar medium at about 10°C to 100°C with
a lithium-sodium alloy of about 0.1 to 90 mole percent sodium content
to obtain the corresponding, at least-bifunctional lithio polydiene, and
b. adding pivalolactone to the product of step (a) and thereby polymerizing the pivalolactone at the two ends of the diene chain.

10. The process of claim 9 wherein the polydiene segment formed in step (a) is a dilithio polydiene.

11. The process of claim 9 wherein the polydiene segment formed in step (a) is dilithio polyisoprene.

12. The process of claim 9 wherein the polydiene segment formed in step (a) is dilithio polybutadiene.

* * * * *

PO-1050
(5/69)

UNITED STATES PATENT OFFICE
CERTIFICATE OF CORRECTION

Patent No. 3,679,776    Dated July 25, 1972

Inventor(s) ROBERT PAUL FOSS

It is certified that error appears in the above-identified patent and that said Letters Patent are hereby corrected as shown below:

Col. 5, line 18, "about 31 10°C." should read
-- about -10°C. --

Col. 10, line 3 (claim 1) there should be a minus sign before "10°C."

Col. 10, line 45, (claim 9) ", wherein" should be inserted after the formula.

Col. 10, line 52, (claim 9) there should be a minus sign before "10°C".

Signed and sealed this 27th day of November 1973.

(SEAL)
Attest:

EDWARD M. FLETCHER, JR.
Attesting Officer

RENE D. TEGTMEYER
Acting Commissioner of Patents